United States Patent Office 3,634,464
Patented Jan. 11, 1972

3,634,464
OLEFIN EPOXIDATION
Harald P. Wulff, Alameda, and Freddy Wattimena, Kensington, Calif., assignors to Shell Oil Company, New York, N.Y.
No Drawing. Filed Apr. 2, 1969, Ser. No. 812,922
Int. Cl. C07d 1/08
U.S. Cl. 260—348.5 L          13 Claims

ABSTRACT OF THE DISCLOSURE

Olefin oxides are produced by the reaction of an organic hydroperoxide and an olefinically unsaturated compound in the presence of a catalyst composition of an oxide of molybdenum and a solid inorganic oxide support, modified by the inclusion therewith of bismuth or certain rare earth metal oxides.

BACKGROUND OF THE INVENTION

The use of organic hydroperoxides in the epoxidation of olefins is known to offer important and distinct advantages over other methods of olefin oxide production. Organic hydroperoxides are relatively inexpensive and convenient and safe to handle. In addition, organic hydroperoxides can readily be obtained and maintained in anhydrous form, thus minimizing potential olefin oxide recovery and purification problems. Also, during the epoxidation reaction, the organic hydroperoxide is converted into the useful corresponding alcohol which also can be readily converted to other valuable products.

A variety of catalysts has been employed for the reaction of olefins with hydroperoxides. One process is that of Smith, U.S. 2,754,325, issued July 10, 1956, wherein soluble heterpoly acids containing transition metals such as chromium, molybdenum and tungsten are employed as homogeneous catalysts for the reaction of olefins and peroxides such as organic hydroperoxides and hydrogen peroxide. More recently, U.S. 3,350,422 and U.S. 3,351,-635, issued Oct. 31, 1967, and Nov. 7, 1967, respectively, to Kollar, describe the use of solutions of transition metal compounds (V, Mo, W, Ti, Nb, Ta, Re, Se, Zr, Te and U) as homogeneous catalysts. Although sufficiently soluble compounds of these transition metals generally may be suitable as homogeneous catalysts, their commonly, to Kollar, describe the use of solutions of transition in general are ineffective as catalyst. For example, U.S. 3,350,422 discloses that epoxidation of propylene with cumene hydroperoxide employing insoluble vanadium pentoxide as catalyst results in a propylene oxide yield (6%) which is little better than that obtained with no catalyst (4%). Similarly, inorganic compounds, particularly the oxides, of the metals disclosed in U.S. 3,351,635, are generally ineffective as heterogeneous catalysts. For example, as the result of experimentation it has been found that in the reaction of 1-octene with t-butylhydroperoxide, a commercial $TiO_2$ gave a 50% conversion of hydroperoxide but essentially zero selectivity to 1-octene oxide; $ZrO_2$ gave a 76.7% conversion of hydroperoxide but only a 1% selectivity to 1-octene oxide; $Nb_2O_5$ gave 9% conversion of hydroperoxide and essentially zero selectivity to 1-octene oxide; $Ta_2O_5$ gave an 11% conversion of hydroperoxide but only a 5% selectivity to 1-octene oxide; $CrO_3$ gave a 99% conversion of hydroperoxide but only a 22% selectivity to 1-octene oxide; $WO_3$ gave an 85% conversion of hydroperoxide but only an 8% selectivity to 1-octene oxide; $Re_2O_7$ gave an essentially quantitative conversion of hydroperoxide but essentially zero selectivity to 1-octene oxide; $TeO_2$ gave a 33% conversion of hydroperoxide but only a 7% selectivity to 1-octene oxide; $SeO_2$ gave a 97% conversion of hydroperoxide but essentially a zero selectivity to 1-octene oxide and $UO_2$ gave a 55% conversion of hydroperoxide but only 5% selectivity to 1-octene oxide. Although U.S. 3,351,635 discloses $MoO_3$ to be an effective catalyst, the $MoO_3$ is soluble in the epoxidation reaction mixture and is therefore ineffective as a heterogeneous catalyst. It would be of advantage, however, to effect the epoxidation of olefins with insoluble catalysts in a heterogeneous system, i.e., with catalyst compositions which are substantially insoluble in the reaction mixture, since heterogeneous catalyst systems generally exhibit a number of operational advantages for large-scale industrial operations. For example, heterogeneous catalyst systems do not require elaborate means for separation of catalyst and reaction products due to the insolubility of the catalyst in the reaction mixture.

SUMMARY OF THE INVENTION

It has now been found that olefin oxides are produced by the reaction of an organic hydroperoxide and an olefinically unsaturated organic compound in the presence of a catalyst composition comprising an oxide of molybdenum and a solid inorganic oxide, modified by the inclusion therewith of bismuth or certain rare earth metal oxides. The catalyst composition is characterized by being essentially insoluble in the epoxidation reaction mixture, providing a heterogeneous system.

DESCRIPTION OF THE PREFERRED EMBODIMENTS

The catalyst composition

The catalyst composition employed in the epoxidation process comprises a solid inorganic oxide catalyst support and an oxide of molybdenum, modified by the inclusion therewith of bismuth or certain rare earth metal oxides.

The oxide of molybdenum is preferably provided on the catalyst support in high positive oxidation state, e.g., hexavalent molybdenum. When the molybdenum is introduced on the catalyst support in some other form, e.g., as a non-oxide, pretreatment is customarily employed to convert the molybdenum to the form of the oxide. The proportion of molybdenum oxide to be employed in the catalyst composition can be varied, but amounts from about 0.1% by weight to about 10% by weight, calculated as oxide on the support, are satisfactory with proportions of from about 0.2% by weight to about 5% by weight, calculated on the same basis, being preferred.

A critical feature of the catalyst composition is the presence therein of a minor proportion of bismuth or certain rare earth oxides as a catalyst modifier. Although the precise role of the catalyst modifier is not known with certainty, it is evident that the modifier plays a substantial role in providing a heterogeneous catalyst composition wherein the oxide of molybdenum is not dissolved in the epoxidation reaction mixture, thereby eliminating the requirement of additional apparatus and separation steps for recovery of any soluble molybdenum. Suitable rare earth metal oxide modifiers are oxides of metals having atomic numbers from 57 to 71 inclusive, i.e., the lanthanides, e.g., lanthanum, cerium, praseodymium, neodymium, promethium, samarium, europium, gadolinium, terbium, dysprosium, holmium, erbium, thulium, ytterbium, and lutetium. Preferred rare earth metals are those wherein the highest possible valency is lower than four. Rare earth metals with a valency which is always lower than four are lanthanum, and those with atomic number from 59 to 64 inclusive, e.g., praseodymium, neodymium, promethium, samarium, europium, and gadolinium. Particularly recommended is a mixture in which lanthanum is present together with one or more lanthanides with atomic numbers between 59 and 64, for example a mixture known as didymium. This mixture consists mainly of lanthanum and neodymium, together with smaller quantities of praseodymium and samarium. The following analysis is typical: $La_2O_3$—45%; $Nd_2O_3$—38%; $Pr_6O_{11}$—11%; $Sm_2O_3$—4% and various—2%.

The form in which the bismuth and rare earth metal modifiers are employed is the oxide, although compounds which are readily converted to the oxide are also suitably employed as these are typically converted to the oxide, e.g., as during pretreatment subsequent to the formation of the initially prepared catalyst composition but prior to use. The amount of catalyst modifier is not critical. In general, amounts of catalyst modifier of from about 0.1% to 10% by weight, calculated as the metal on the catalyst support, are satisfactory, with amounts of catalyst modifier of from about 0.1% by weight to about 5% by weight, also calculated as the metal on the catalyst support, being preferred.

The catalyst support comprises a normally solid, inorganic oxide material containing a major proportion of at least one oxide component selected from silica and alumina. Such materials are known as refractory oxides and are characterized by having a relatively large surface area in relation to their mass. The term herein and one normally used in the art to express the relationship of surface area to mass is "specific surface area." Numerically, specific surface area will be expressed as square meters per gram ($m.^2/g.$). Generally, the solid inorganic support has an average specific surface area of at least 1 $m.^2/g.$ and preferably the average specific surface area is from about 25 $m.^2/g.$ to 800 $m.^2/g.$ Suitable solid inorganic refractory oxide catalyst supports includes synthetic components as well as clays and similar materials or crystalline aluminosilicates known in the art as molecular sieves. Synthetic solid inorganic oxides are preferred over naturally-occurring materials or molecular sieves and exemplary inorganic refractory oxides include silica, silica-alumina, silica-magnesia, silica-zirconia, boria-alumina, silica-alumina-boria, silica-alumina-zirconia, silica-alumina-magnesia, and silica-titania-zirconia. Preferred inorganic refractory oxide supports are siliceous refractory oxides, that is refractory oxides containing silica as the major component, e.g., at least 75% silica, and particularly preferred as the siliceous refractory oxide is silica gel.

In certain modifications of the process, it is desirable to include within the supported catalyst composition lesser amounts of a catalyst promoter in addition to the active catalyst materials as described above. Suitable catalyst promoters are the alkaline earth metals, e.g., magnesium, calcium, strontium and barium. The form in which the catalyst promoters are employed is preferably the oxide, although compounds which are readily converted to the oxide are also suitably employed as these are typically converted to the oxide as during pretreatment subsequent to the formation of the initially prepared catalyst composition but prior to use. The amount of catalyst promoter is not critical, and as previously stated no catalyst promoter is required. When present, amounts of catalyst promoter up to about 10% by weight, calculated as metal on the catalyst support, are satisfractory. The use of the catalyst promoter is preferred when employing inorganic refractory oxides containing strongly acidic sites, e.g., refractory oxides having an intrinsic acidity of less than —3. The intrinsic acidity of an inorganic refractory oxide, generally represented by the term $pK_a$ is determined by titration of an inorganic refractory oxide with an appropriate base in the presence of dye indicators, as disclosed, for example, in U.S. 2,868,688 of Benesi et al., issued Jan. 13, 1959.

The preparation of the supported catalyst composition is effected by conventional techniques of dry-mixing, co-gellation, co-precipitation, impregnation, ion-exchange and the like, and the catalyst compositions components are introduced in one operation or are added separately in stages. In the latter modification, the order in which the various components are added to the support is not critical, although it is generally preferred to add the molybdenum compound subsequent to the other catalyst components.

In practice, the supported molybdenum catalyst is subjected to a pretreatment or activation prior to utilization in the process. The precise method of pretreatment will depend in part upon the form of chemical combination in which the components are provided, but in general the pretreatment comprises heating an initially prepared catalyst in an atmosphere of a non-reducing gas such as nitrogen, argon, carbon monoxide or oxygen-containing gas, e.g., air. One function served by this type of pretreatment is to convert the catalyst, catalyst promoter and catalyst modifier compounds into the form of oxides if these components are not initially provided as the oxide. For example, initial catalyst composition components such as ammonium molybdate, potassium hydroxide and didymium nitrate and the like are converted to corresponding oxides by heating in a non-reducing atmosphere. The pretreatment temperature is not critical and temperatures from about 350° C to 800° C. are satisfactory. Typical pretreatment times are from about 1 to about 18 hours. Subsequent to pretreatment, the supported molybdenum catalyst is employed in any convention physical form, for example as powder, flakes, spheres or pellets.

The olefinic reactant

The process of the invention is generally applicable to the epoxidation of any organic compound having at least one aliphatic, olefinically unsaturated carbon-carbon double bond, and generally of from 2 to 60 carbon atoms, but preferably of from 2 to 30 carbon atoms. The olefinic reactant is an acylic, a monocyclic, a bicyclic or a polycyclic olefin and is a monoolefin, diolefin or polyolefin. The olefinic linkages of diolefins and polyolefins are either conjugated or non-conjugated. The olefinic reactant preferably is hydrocarbon containing only atoms of carbon and hydrogen, but it can be a substituted-hydrocarbon, additionally containing relatively stable functional groups incorporating atoms such as oxygen, halogen, sulfur and nitrogen.

Suitable hydrocarbon monoolefins include acyclic alkenes of from 2 to 40 carbon atoms such as propylene, isobutylene, hexene-3, decene-1, triacontene-8, and tetracontene-1; monocyclic monoolefins such as cyclopentene, methylenecyclohexane, allylbenzene, and 1-phenyl-3-methyl-3-hexene-1-yne; bicyclic monoolefins of fused or separate rings such as bicyclo(2.2.2)oct-2-ene, bicyclo-(4.3.0)non-2-ene and 1,2-dihydronaphthalene; polycyclic monoolefins such as tricyclo($4.2.1^{2,5}$)non-7-ene, quadricyclo($2.2.1.2^{2,6}0^{3,5}$)non-8-ene, 3,4,7,8-tetraphenyltricyclo-($4.2.1.0^{2,5}$)non-7-ene and 2-cholestene.

Suitable hydrocarbon diolefins include acyclic diolefins such as butadiene, 1,4-pentadiene and 1,6-heptadiene; monocyclic diolefins such as 1,3-cyclohexadiene, 1,5-cyclooctadiene, 1,4-dimethylenecyclohexane, 1,4-divinylbenzene, and 1,4-dipropenylbenzene; bicyclic diolefins of fused or separate rings such as bicyclo(2.2.1)hepta-2,5-diene, bicyclo(3.3.1)octa - 2,6 - diene, 1-cyclohexylcyclohexa-1,3-diene, 2,3-diphenyl-1,5-hexadiene; polycyclic diolefins such as tricyclo-($4.2.1.0^{2,5}$)nona-3,7-diene, quadricyclo($4.4.1.0^{2,5}0^{7,10}$)-undeca - 3,8 - diene and 2,4-cholestadiene.

Suitable hydrocarbon polyolefins include cyclic polyolefins such as 1,3,5-cyclooctatriene, 1,5,9-cyclododecatriene and bicyclo(4.2.1)nona-2,4,7-triene and acyclic polyolefins such as 1,3,5-hexatriene, squalene, carotene and polyisoprene.

Among the oxygen-containing substituted-hydrocarbon olefins which are suitably epoxidized by the process of the invention are, for example, (a) unsaturated alcohols such as allyl alcohol, crotyl alcohol, oleyl alcohol and cyclohexanol; (b) unsaturated ethers such as diallyl ether, 3-vinyltetrahydropyan and phenyl allyl ether; (c) olefinically unsaturated carboxylic acids such as crotonic acid, oleic acid and tetrahydrobenzoic acid; (d) olefinically unsaturated esters such as ethyl methacrylate, allyl acetate, methyl 5-hexenoate, δ-lactone of 5-hydroxy-2-pentenoic acid; (e) olefinic ketones such as methyl allyl ketone, mesityl oxide and oct-1-en-5-one; (f) olefinic aldehydes such as crotonaldehyde, cinnamyl aldehyde and 1,2,5,6-tetrahydrobenzaldehyde; (g) olefinic epoxides such as 1,2-epoxy-5-hexene; and (h) oxygen-containing compounds such as soy bean oil and corn oil.

Exemplary suitable halogen-containing substituted-hydrocarbon olefins are allyl chloride, methallyl chloride and cyclohexenyl chloride.

Suitable nitrogen-containing substituted hydrocarbon olefins are, for example, olefinic nitriles such as 3-cyanocyclohexene and 4-cyanobutene-2; olefinic amides such as oleamide and N-methyloleamide; olefinic nitro compounds such as 4-nitro-1-butene and 4-nitro-7-bromo-1,2-dihydronaphthalene; lactam of 6-amino-4-hexenoic acid and allylpyrrolidone.

A preferred class of olefinic reactants are olefins of from 3 to 40 carbon atoms, of up to 4 olefinic linkages and represented by Formula I:

wherein R independently is hydrogen, hydrocarbyl or substituted-hydrocarbyl additionally containing halogens of atomic number from 7 to 53 inclusive, i.e., fluorine, chlorine, bromine and iodine, and oxygen incorporated in functional groups such as hydrocarbyloxy, hydrocarboyl, hydrocarbyloxycarbonyl, hydrocarboyloxy, epoxy and hydroxy, with the proviso that any two hydrocarbyl R groups can be joined to form a 3 to 9-membered carbocyclic ring.

Suitable hydrocarbyl R groups include alkyl such as ethyl, butyl and octyl; cycloalkyl such as cyclobutyl and cyclohexyl; alkenyl such as propenyl, hexenyl and decenyl; cycloalkenyl such as cyclopentyl and cyclohexenyl; alkaryl of 1 or 2 fused or separate 6-membered rings such as tolyl and methylnaphthyl; aryl such as phenyl and naphthyl; and aralkyl such as phenylethyl and naphthylbutyl. Suitable halogen-containing hydrocarbyl groups are therefore groups such as chloromethyl, p-bromophenyl and trifluoromethyl. Illustrative hydrocarbyloxy functional groups are alkoxy such as methoxy and propoxy; aralkoxy such as benzyloxy; alkaryloxy such as p-methylphenoxy; and aryloxy such as p-chlorophenoxy and naphthoxy. Illustrative hydrocarboyl groups are alkanoyl such as acetyl and hexanoyl; and aryloyl such as benzoyl, toluoyl and xyloyl. Illustrative hydrocarboyloxy groups are alkanoyloxy such as acetoxy and decanoyloxy; and aryloyloxy such as benzoyloxy, o-toluoyloxy and naphthoyloxy. Illustrative hydrocarbyloxycarbonyl groups are carboalkoxy such as carbomethoxy and carbethoxy; carboaralkoxy such as carbobenzyloxy; and carboaryloxy such as carbophenoxy and carbonaphthoxy. Exemplary olefins of Formula I containing both hydrocarbyl and substituted-hydrocarbyl R groups are illustrated by the olefinic reactants specified in the previous paragraphs.

The olefinic hydrocarbons of Formula I are particularly preferred as reactants. When substituted-hydrocarbon olefinic reactants are to be epoxidized, it is preferred to use substances which contain only a single functional group, e.g., olefinic reactants of Formula I wherein only one R group is substituted-hydrocarbyl.

The organic hydroperoxide

The process of the invention is broadly applicable to the use of any organic compound having at least one hydroperoxide moiety. One suitable class of organic hydroperoxides having from 3 to 20 carbon atoms is represented by Formula II:

where R' is a hydrocarbyl group or a substituted-hydrocarbyl group additionally containing halogens of atomic number 7 to 53 inclusive, e.g., fluorine, chlorine, bromine and iodine, and oxygen incorporated into functional groups such as hydroxy, hydrocarbyloxy, hydrocarboyl, hydrocarbyloxycarbonyl, hydrocarboyloxy and the like.

Suitable organic hydroperoxides of Formula II therefore include tertiary substituted- and unsubstituted-hydrocarbon hydroperoxides such as tertiary alkyl hydroperoxides, e.g., tertiary butyl hydroperoxide, tertiary amyl hydroperoxide, 1-chloromethyl-1-bromomethylprop-1-yl hydroperoxide, 1-propylcyclopentylhydroperoxide and 1-methylcyclohexyl hydroperoxide; tertiary aralkyl hydroperoxides, e.g., α,α-dimethylbenzyl hydroperoxide and α,α-diethylbenzyl hydroperoxide; secondary substituted- or unsubstituted-hydrocarbon hydroperoxides such as secondary alkyl hydroperoxides, e.g., cyclohexyl hydroperoxide, isopropyl hydroperoxide, α-hydroperoxy diisopropyl ketone and 3-hydroperoxycyclohexene; secondary aralkyl hydroperoxides, e.g., α-methylbenzyl hydroperoxide, 1-(1-hydroperoxyethyl) - 4 - chlorobenzene, Tetralin hydroperoxide and 1,4-dihydronaphth-1-yl hydroperoxide; primary substituted and unsubstituted-hydrocarbon hydroperoxides such as 1-propyl hydroperoxide, but-2-en-1-yl hydroperoxide, benzyl hydroperoxide, p-bromobenzyl hydroperoxide, and o-methylbenzyl hydroperoxide.

Particularly useful hydroperoxides are aralkyl hydroperoxides wherein the hydroperoxy group is on a carbon atom attached directly to the aromatic ring, e.g. α-hydroperoxy-substituted aralkyl compounds such as α-methylbenzyl hydroperoxide.

In the epoxidation reaction, the molar ratio of olefinic reactant to hydroperoxide can vary over a wide range and a molar excess of either the olefinic reactant or hydroperoxide of up to as high as 100:1 can be used. In general, molar ratios of olefinic reactant to hydroperoxide varying from about 50:1 to about 1:10 are satisfactory, although it is preferred to employ molar ratios of olefinic reactant to hydroperoxide of about 20:1 to about 1:1.

Hydrocarbon hydroperoxides are preferred for use in the process of the invention. Particularly preferred hydrocarbon hydroperoxides are secondary and tertiary hydroperoxides of up to 15 carbon atoms, especially tertiary alkyl hydroperoxides and aralkyl hydroperoxides wherein the hydroperoxy group is on a carbon atom attached directly to an aromatic ring.

The organic hydroperoxide reactant may be supplied in dilute or concentrated, purified or unpurified form. Hydrocarbon hydroperoxides are economically prepared by direct oxidation as exemplified by U.S. 2,845,461 of Winkler et al. and U.S. 2,867,666 of Erickson et al. In such oxidations molecular oxygen is passed through hydrocarbon to convert at least a portion of the hydrocarbon to hydroperoxide. Generally, the hydroperoxide is present in concentration of about 5 to 70% by weight in the starting hydrocarbon. Side products such as alcohols and other impurities are also often present in minor amount. This oxidation product may be suitably used without treatment although it may in some cases be preferable to concentrate or purify the hydroperoxide such as by distillation.

The reaction conditions

The process of the invention is conducted in the liquid phase in solvents or diluents which are liquid at reaction temperature and pressure and are substantially inert to the reactants and the products produced therefrom. Illustrative suitable solvents are oxygen-containing solvents such as fully esterified polyacyl esters of polyhydroxyalkanes, e.g., glycerol triacetate, tetraacyl esters of erythritol, diethylene glycol diacetate; monoesters such as butyl propionate and phenyl acetate; ketones such as acetone, diethyl ketone and methyl isobutyl ketone; ethers such as dibutyl ether, dioxane and tetrahydrofuran, as well as nitrogen-containing solvents such as nitriles, e.g., acetonitrile and propionitrile; and dialkylamides such as dimethylformamide. Preferred solvents are mononuclear aromatic such as benzene, toluene, chlorobenzene, bromobenzene, o-dichlorobenzene; and alkanes such as octane, decane, and dodecane. In certain modifications of the epoxidation process, a portion of the olefinic reactant serves as the reaction solvent and no added solvent is needed. In most instances, however, added solvent is used and amounts up to about 20 moles of solvent per mole of organic hydroperoxide are satisfactory. The process is preferably conducted in an inert reaction environment so that the presence of reactive materials such as water is desirably avoided. Suitable reaction conditions are therefore substantially anhydrous.

The epoxidation reaction is suitably conducted by any of a variety of procedures. In one modification, the entire amounts of reactants, the catalyst and the solvent are charged to an autoclave or similar pressure reactor and the reaction mixture is maintained with agitation at reaction temperature and pressure for the desired reaction period. In another modification, one reactant is added to the remaining reaction mixture components in increments, as by adding the organic hydroperoxide to a mixture of the olefinic reactant, the catalyst and the solvent maintained at reaction temperature and pressure. In yet another modification, reaction is effected in a continuous manner as by contacting the olefin reactant, the organic hydroperoxide and the solvent during passage through a reaction zone in which the solid catalyst is maintained in particulate form. By any modification, the epoxidation process is conducted at moderate temperatures and pressures. Suitable reaction temperatures vary from about 0° C. to about 200° C., but preferably from 25° C. to 200° C. The reaction is conducted at or above atmospheric pressure. The precise pressure is not critical so long as the reaction mixture is maintained substantially in a non-gaseous phase. Typical pressures vary from about 1 atmosphere to about 100 atmospheres.

At the conclusion of the reaction, the product mixture is separated and the products are recovered by conventional methods such as fractional distillation, selective extraction, filtration and the like. The reaction solvent, the catalyst and any unreacted olefin or hydroperoxide are recycled for further utilization.

The products

According to the process of the invention the olefinic reactant is epoxidized to the corresponding olefin oxide. By way of illustration, propylene oxide is produced from propylene, 3,4-epoxy-4-methyl-3-pentan-2-one is produced from 4-methyl-3-penten-2-one, methyl 5,6-epoxyhexanoate is produced from methyl 5-hexenoate, 2,3-epoxypropyl methyl ether is produced from allyl methyl ether, 1,2-epoxy-5-benzyloxypentane is produced from 5-benzyloxypentene-1, 1,2-epoxybutan-4-ol is produced from 1-buten-4-ol, 1,2-epoxybut-4-yl chloride is produced from 1-buten-4-yl chloride, 3,4-epoxybutyl benzyl sulfone from 3-butenyl benzyl sulfone, 1-chloro-3,4-epoxyhexan-5-ol is produced from 1-chloro-3-hexen-5-ol, and 1-(3,4-epoxybutyl)-4-methoxybenzene is produced from 1-(3-butenyl)-4-methoxybenzene.

In the case of diolefinic reactants, it is possible to epoxidize only one of the olefinic linkages or both. By way of illustration, butadiene is epoxidized to 1,2-epoxy-3-butene and/or 1,2-epoxy-3,4-epoxybutane, chloroprene is epoxidized to 3,4-epoxy-2-chloro-1-butene and 1,3-divinylcyclopentane is epoxidized to 1,3-bis(epoxyethyl)-cyclopentane and/or 1-epoxyethyl-3-vinylcyclopentane.

In the case of polyolefinic reactants, it is possible to epoxidize only one or several or all of the ethylenic linkages. By way of illustration, 1,3,5-triallyl benzene is epoxidized to 1-(2,3-epoxypropyl)-3,5-diallylbenzene, 1,3-di-(2,3-epoxypropyl)-5-allylbenzene and/or 1,3,5-tri-(2,3-epoxypropyl)benzene, and squalene is epoxidized to squalene hexaoxide, squalene pentaoxide, squalene tetraoxide, squalene trioxide, squalene dioxide and/or squalene monooxide.

The olefin oxide products are materials of established utility and many are chemicals of commerce. For example, illustrative olefin oxides which are readily prepared by the process of the invention such as propylene oxide, 1,2-epoxybutane, 1,2-epoxydodecane and 1,2-epoxyhexadecane are formulated into useful polymers by polymerization or copolymerization as disclosed by U.S. Pat. 2,815,343; 2,871,219; and 2,987,489. Propylene oxide is currently prepared commercially by the classic chlorohydrin process.

According to the process of the invention, the organic hydroperoxide is converted to the corresponding alcohol. The alcohol can be recovered as a co-product of the process or reconverted to the hydroperoxide by procedures such as dehydration to olefin, hydrogenation of the olefin and oxidation to hydroperoxide, or by hydrogenolysis to hydrocarbon followed by oxidation to hydroperoxide.

EXAMPLE I (A) A 20 g. sample of commercial silica gel having a surface area of 300 m.$^2$/g. and pore volume of 1.15 cc./g. was contacted with a solution of 0.442 g. of ammonium paramolybdate [(NH$_4$)$_6$Mo$_7$O$_{24}$·4H$_2$O] in 24 ml. of water. The impregnated silica gel was dried at 150° and then calcined at 500° C. for 2 hours. The resulting silica composition contained 1.1% by weight of molybdenum, calculated as metal.

(B) A 20 g. sample of commercial silica gel having a surface area of 300 m.$^2$/g. and a pore volume of 1.15 cc./g. (Davison grade 62) was contacted with a solution of 0.442 g. of ammonium paramolybdate

[(NH$_4$)$_6$Mo$_7$O$_{24}$·4H$_2$O]

0.737 g. of didymium nitrate (a mixture of rare earth nitrates), 26 ml. of water, 1 ml. of 16 N nitric acid and 2 ml. of 50% wt. hydrogen peroxide. The impregnated silica gel was dried at a temperature of 150° for 2 hours. A 10 g. sample of the composite was calcined at 500° C. for 2 hours. The resulting silica gel product contained 1.1% by weight of molybdenum, calculated as metal, and 1.2% by weight of didymium, calculated as metal.

(C) In a series of comparative experiments, the effectiveness of the didymium-modified molybdena-silica composition prepared in Example IB and the unmodified molybdena-silica composition prepared in Example IA as heterogeneous epoxidation catalysts was tested by contacting each composition in a solution of 1-octene and t-butyl alcohol and determining the loss of molybdenum from the molybdenum-silica compositions. Each experiment was conducted with a 2 g. sample of the indicated molybdena-silica composition, 25 ml. of t-butyl alcohol and 25 ml. of 1-octene at a temperature of 110° C. After the indicated reaction time, the recovered catalyst was analyzed for molybdenum (as metal) content. The results are provided in Table 1.

TABLE 1

| Catalyst composition | Molybdenum concentration, percent w. | | |
|---|---|---|---|
| | Initial | After 4 hrs. | After 26.5 hrs. |
| Mo on SiO$_2$ (Example IA) | 1.1 | 0.50 | 0.47 |
| Mo, didymium on SiO$_2$ (Example IB) | 1.1 | 1.08 | 1.05 |

EXAMPLE II

A 0.3 g. sample of the molybdena-didymium oxide-silica catalyst composition of Example IB was contacted with 42 g. of 1-octene and 5.5 g. t-butylhydroperoxide at a temperature of 110° C. for ½ hour. Analysis of the product mixture showed a 91% conversion of t-butylhydroperoxide and a 91.3% selectivity to 1-octene oxide based on converted hydroperoxide.

EXAMPLE III

A 20 g. sample of commercial silica gel having a surface area of 300 m.²/g. and a pore volume of 1.15 cc./g. (Davison grade 62) was contacted with a solution of 1.94 g. of bismuth nitrate [Bi(NO$_3$)$_3$·5H$_2$O], 1.766 g. of ammonium paramolybdate [(NH$_4$)$_6$Mo$_7$O$_{24}$·4H$_2$O], 28 ml. of 8 N nitric acid and 4 ml. of 50% wt. hydrogen peroxide. The impregnated silica gel was dried at 150° C. and then calcined at 500° C. for 2 hours. The resulting silica gel contained 4.2% by weight of bismuth as metal and 4.8% by weight of molybdenum as metal.

A 0.5 g. sample of the bismuth-molybdena-silica composition was contacted with 30 g. of 1-octene and 4 g. of t-butylhydroperoxide in 16 g. of n-hexane in a 100 ml. glass reactor at 110° C. for 1 hour. Analysis of the product mixture showed a 72.5% conversion of t-butylhydroperoxide and a 78.6% selectivity to 1-octene oxide based on converted hydroperoxide.

EXAMPLE IV

A 50 g. sample of commercial silica gel having a surface area of 340 m.²/g. and a pore volume of 1.15 cc./g. was contacted with a solution of 2.21 g. of ammonium paramolybdate [(NH$_4$)$_6$Mo$_7$O$_{24}$·4H$_2$O], 4.37 g. of didymium nitrate (a mixture of rare earth nitrates), 40 ml. of water, 10 ml. of 16 N nitric acid and 4 ml. of 50% wt. hydrogen peroxide. The impregnated silica gel was dried at 150° C. and then calcined at 800° C. for 2 hours. The resulting silica gel product contained 2.4% by weight of molybdenum, calculated as metal, and 2.86% by weight of rare earth metals.

EXAMPLE V

A mixture of 0.5 g. sample of the molybdena-didymium oxide-silica composition of Example IV, 20 ml. of 1-cyanomethylcyclohexene and 2 ml. of t-butylhydroperoxide was contacted in a 100 ml. glass reactor at 110° C. for 2 hours. Analysis of the product mixture showed a 100% conversion of t-butylhydroperoxide and an 82% selectivity to 1-cyanomethylcyclohexene oxide based on converted hydroperoxide.

By a similar procedure, cyclohexen-3-yl chloride and cyclohexen-3-ol are epoxidized in good yields.

EXAMPLE VI

In a series of experiments a variety of inorganic metal oxide compounds was tested as heterogeneous catalysts for the epoxidation of 1-octene with t-butylhydroperoxide (TBHP). In each experiment a 1 g. sample of the indicated metal oxide compound was contacted with 36.5–42 g. of 1-octene and 4.5–5.5 g. of t-butylhydroperoxide. The reaction conditions, the hydroperoxide conversion and the selectivity to 1-octene oxide based on converted hydroperoxide are provided in Table II.

TABLE II

| Catalyst | Nonane diluent, g. | Reaction time, hrs. | Temp., °C. | Hyperperoxide conversion, percent | Epoxide selectivity, percent |
|---|---|---|---|---|---|
| TiO$_2$ (Cabot Corp.) | 2.1 | 20 | 110 | 50 | 0 |
| TiO$_2$ (Degussa, Inc.) | 2.1 | 19 | 110 | 40 | 0 |
| ZrO$_2$ | 2.1 | 20 | 107 | 76.7 | 1 |
| NbSO$_5$ | 0 | 4½ | 115 | 9 | 0 |
| Ta$_2$O$_5$ | 0 | 4½ | 110 | 11 | 5 |
| CrO$_3$ | 0 | ½ | 108 | 99 | 22 |
| WO$_3$ | 0 | 22 | 111 | 85 | 8 |
| Re$_2$O$_7$ | 0 | 4 | 110 | 100 | 0 |
| TeO$_2$ | 0 | 22 | 110 | 33 | 7 |
| SeO$_2$ | 0 | 3 | 110 | 97 | 0 |
| UO$_2$ | 0 | 20 | 110 | 55 | 5 |

We claim as our invention:

1. A process of epoxidizing an olefinically unsaturated organic compound by reacting the olefinically unsaturated compound with an organic hydroperoxide in the presence of a catalyst composition comprising molybdenum oxide on a solid inorganic oxide catalyst support containing a major proportion of at least one oxide component selected from silica and alumina, said catalyst composition incorporating from about 0.1% to 10% by weight of bismuth or rare earth metal oxide.

2. The process of claim 1 wherein the catalyst support is an inorganic siliceous solid and the molybdenum oxide is present in amounts from 0.2% by weight to 5% by weight calculated as molybdenum on the catalyst support.

3. The process of claim 2 wherein the olefinically unsaturated compound has from 2 to 60 carbon atoms, from 1 to 4 olefinic linkages and contains only the atoms of carbon, hydrogen, oxygen, halogen and nitrogen.

4. The process of claim 3 wherein the organic hydroperoxide is a hydrocarbon hydroperoxide of from 3 to 20 carbon atoms.

5. The process of claim 4 wherein the olefinically unsaturated compound contains only the atoms of carbon and hydrogen .

6. The process of claim 5 wherein the hydrocarbon hydroperoxide is tertiary alkyl hydroperoxide and the olefinically unsaturated compound is an alkene of from 3 to 40 carbon atoms.

7. The process of claim 6 wherein the olefinically unsaturated compound is propylene and the hydroperoxide is tertiary butylhydroperoxide.

8. The process of claim 5 wherein the hydrocarbon hydroperoxide is an aralkyl hydroperoxide wherein the hydroperoxide group is on a carbon atom attached directly to an aromatic ring and the olefinically unsaturated compound is an alkene of from 3 to 40 carbon atoms.

9. The process of claim 8 wherein the olefinically unsaturated compound is propylene and the hydroperoxide is ethylbenzene hydroperoxide.

10. The process of claim 4 wherein the olefinically unsaturated compound contains only the atoms of carbon, hydrogen and halogen.

11. The process of claim 10 wherein the olefinically unsaturated compound is allyl chloride.

12. The process of claim 4 wherein the olefinically unsaturated compound contains only the atoms of carbon, hydrogen and oxygen.

13. The process of claim 12 wherein the olefinically unsaturated compound is allyl alcohol.

References Cited

UNITED STATES PATENTS 3,526,645   9/1970   Vangermain et al. ____ 260—348.5

FOREIGN PATENTS 1,060,122   2/1967   Great Britain _____ 260—348.5
1,524,851   4/1968   France _____ 260—348.5

NORMA S. MILESTONE, Primary Examiner

U.S. Cl. X.R.

260—326.5 D, 239.3 R